Dec. 3, 1968

O. I. GILBERTSON ET AL 3,414,814

METHOD OF AND APPARATUS FOR TESTING CROSS SECTION
AND CONTINUITY OF AND THE SEPARATION BETWEEN
A PLURALITY OF CONDUCTORS

Filed Dec. 31, 1964

INVENTORS
O. I. GILBERTSON
O. KACZMARSKY

BY A. J. Nugent
ATTORNEY

United States Patent Office 3,414,814
Patented Dec. 3, 1968

3,414,814
METHOD OF AND APPARATUS FOR TESTING CROSS SECTION AND CONTINUITY OF AND THE SEPARATION BETWEEN A PLURALITY OF CONDUCTORS
Oswald I. Gilbertson, Nutley, and Orest Kaczmarsky, Old Bridge, N.J., assignors to Western Electric Company Incorporated, New York, N.Y., a corporation of New York
Filed Dec. 31, 1964, Ser. No. 422,711
7 Claims. (Cl. 324—73)

ABSTRACT OF THE DISCLOSURE

A method for testing a plurality of conductors wherein a relatively high value of current of predetermined magnitude and duration is passed through the conductors to test the adequacy of the cross section thereof, followed by applying a relatively low current through said conductors to test the continuity thereof, and impressing a voltage between adjacent conductors for testing the adequacy of separation therebetween. The current test steps are sequential as stated above.

The apparatus contemplates means for accomplishing the above results and includes: a source supplying a current of fixed magnitude for carrying out the cross sectional test and an electrical power source for supplying the continuity test current and the adequacy of separation test voltage. Said apparatus also encompasses stepper and timing means for controlling the application of the test currents and test voltage to the conductors for desired time durations and also for correlating the tests with connection of the conductors in series and parallel circuit arrangements.

---

This invention relates to the testing of electrical circuits and more particularly to the testing of the conducting paths of printed wiring boards.

In the last few years, printed wiring board units have replaced wired equipment in many circuit applications. In response to the increased demand a variety of processes have been developed for use in the mass production of printed wiring boards. One such process which is additive in nature involves the formation of the conducting paths by the deposition of conducting material on the board. This process produces variation in the width, thickness and spacing of the paths. In addition, hairline discontinuities and copper smudges occur which may reduce the spacing or produce shorts. In order to make certain that the printed wiring boards meet acceptable standards, it becomes necessary to test each board prior to subsequent manufacturing processes.

An object of the invention is to provide a method of and apparatus for testing a plurality of conductors.

Another object of this invention is to provide a method of and apparatus for testing of current carrying capacity, continuity, shorts and spacing of the conducting paths.

Briefly, the invention is concerned with a method of and apparatus for testing a plurality of conductors by, sequentially, fusing open any path that is of insufficient cross-section, testing the paths for continuity, and testing for shorts and the sufficiency of the spacing between adjacent paths.

In accordance with the object, the apparatus comprises a plurality of spring-loaded plungers placed in predetermined locations to contact the end points of all circuit paths, and test circuitry means for applying first a high amperage current to all the circuit paths, disconnecting the source of high amperage current and applying a lower amperage current to the circuit paths to test the continuity thereof, and disconnecting the lower amperage current source and applying a high voltage between adjacent paths to test for shorts and the adequacy of the spacing between the paths.

These and other features, advantages and objects of the invention will be understood clearly from the following detailed description and the accompanying drawings wherein.

Figure 1:
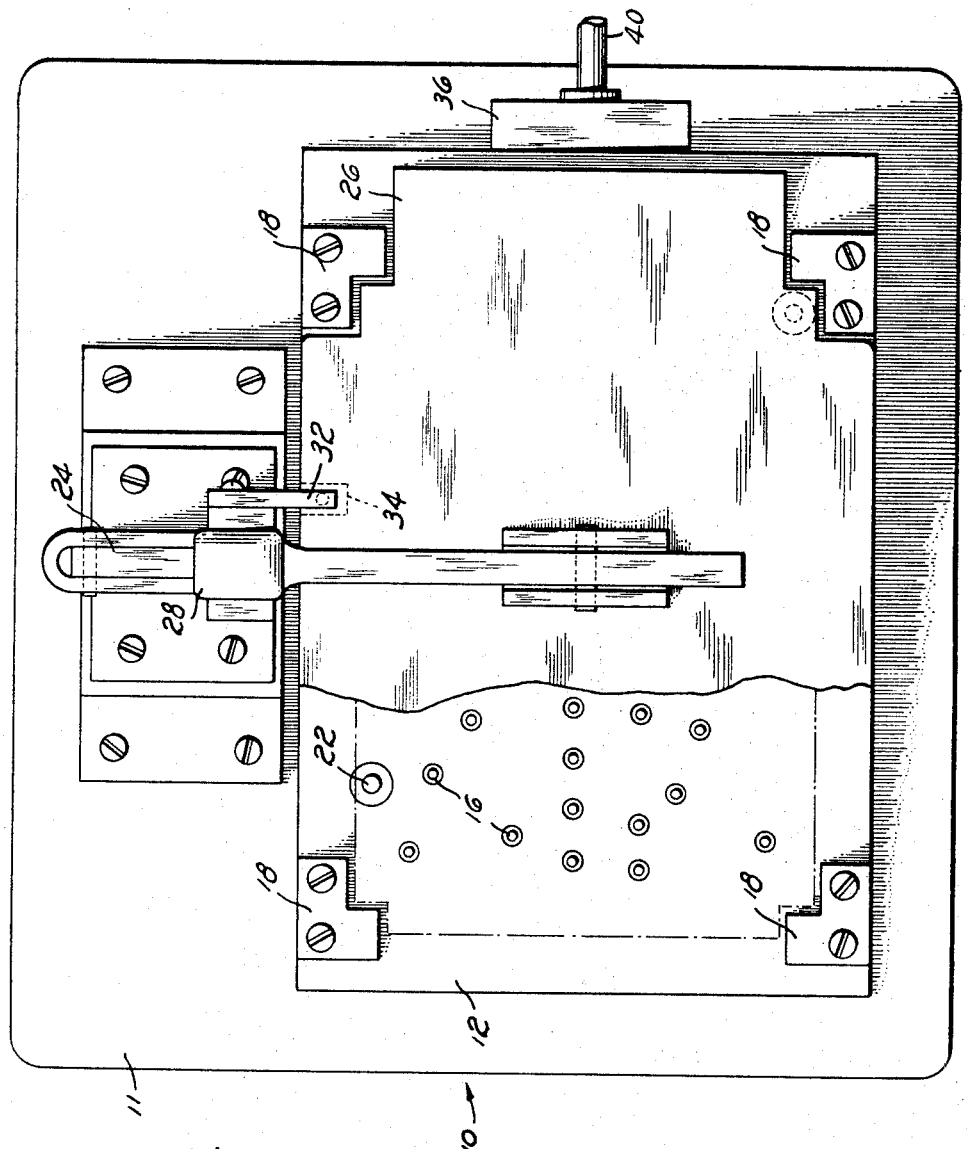
FIG. 1 is a plan view of a preferred embodiment of a fixture in which to carry out the invention with a portion thereof cut away.
Figure 2:
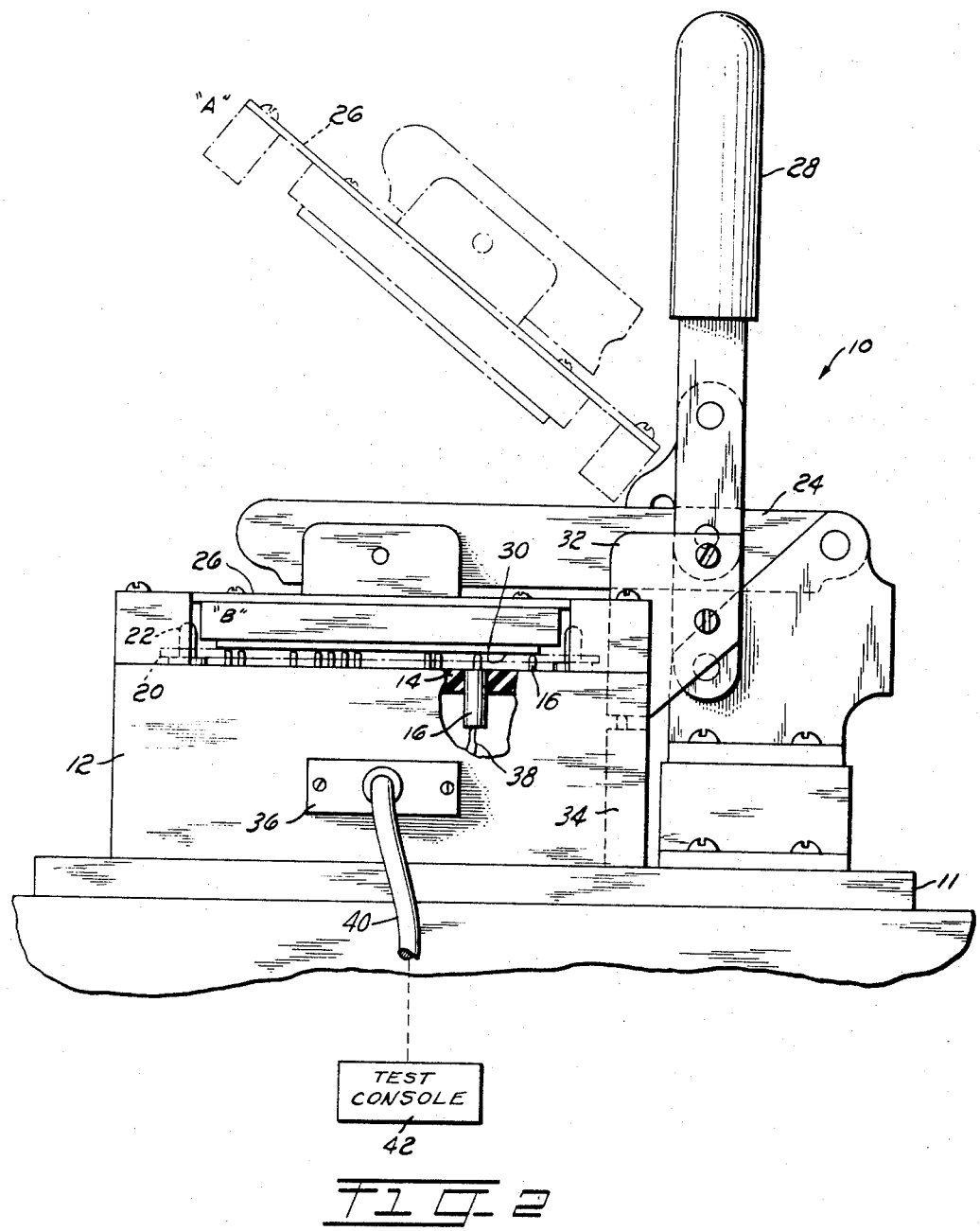
FIG. 2 is a side view of the fixture partially in section.

With reference to FIGS. 1 and 2 of the drawings, a preferred embodiment of the invention comprises a test fixture 10 which comprises a base 11, a frame 12 mounted thereon, and an insulating support member 14 mounted in frame 12. A plurality of spring-loaded plungers 16—16 are mounted on support member 14. Shoulder members 18—18 are mounted at the corners of the frame 12 to support a printed wiring board 20 to be tested. A plurality of locating pins 22—22 are mounted on support member 14 to facilitate the loading of the printed wiring board onto the fixture. A hinged member 24 is mounted on base 11 adjacent frame 12 and includes a cover 26 for the frame. The hinged member 24 is movable by manipulation of a handle 28 from an open position A to a closed position B whereat the under surface 30 of cover 26 contacts the printed wiring board 20. An actuating member 32 is mounted on handle 28 and is operable to close the operating button of a microswitch 34 which is part of the test circuitry.

A connector 36 is mounted on frame 12 and includes a plurality of conductors 38—38 which are connected at one end thereof to several of the spring-loaded plungers 16—16 and at the other end thereof, through cable 40, to a test set console 42. Test console 42 includes therein the test circuitry (FIG. 3) for carrying out the electrical verification test of the circuit paths of a printed wiring board.

To initiate the testing of a succession of identical printed wiring boards, as in a production line, certain of the contacts 16—16 are strapped together in a predetermined pattern so that when a board is placed on the fixture, a continuous circuit can be established through all the circuit paths, the straps, and certain closed relay contacts of the test circuitry. For short and spacing testing, the continuous path consisting of paths, straps and relay contacts is separated by opening the relay contacts.

Figure 3:
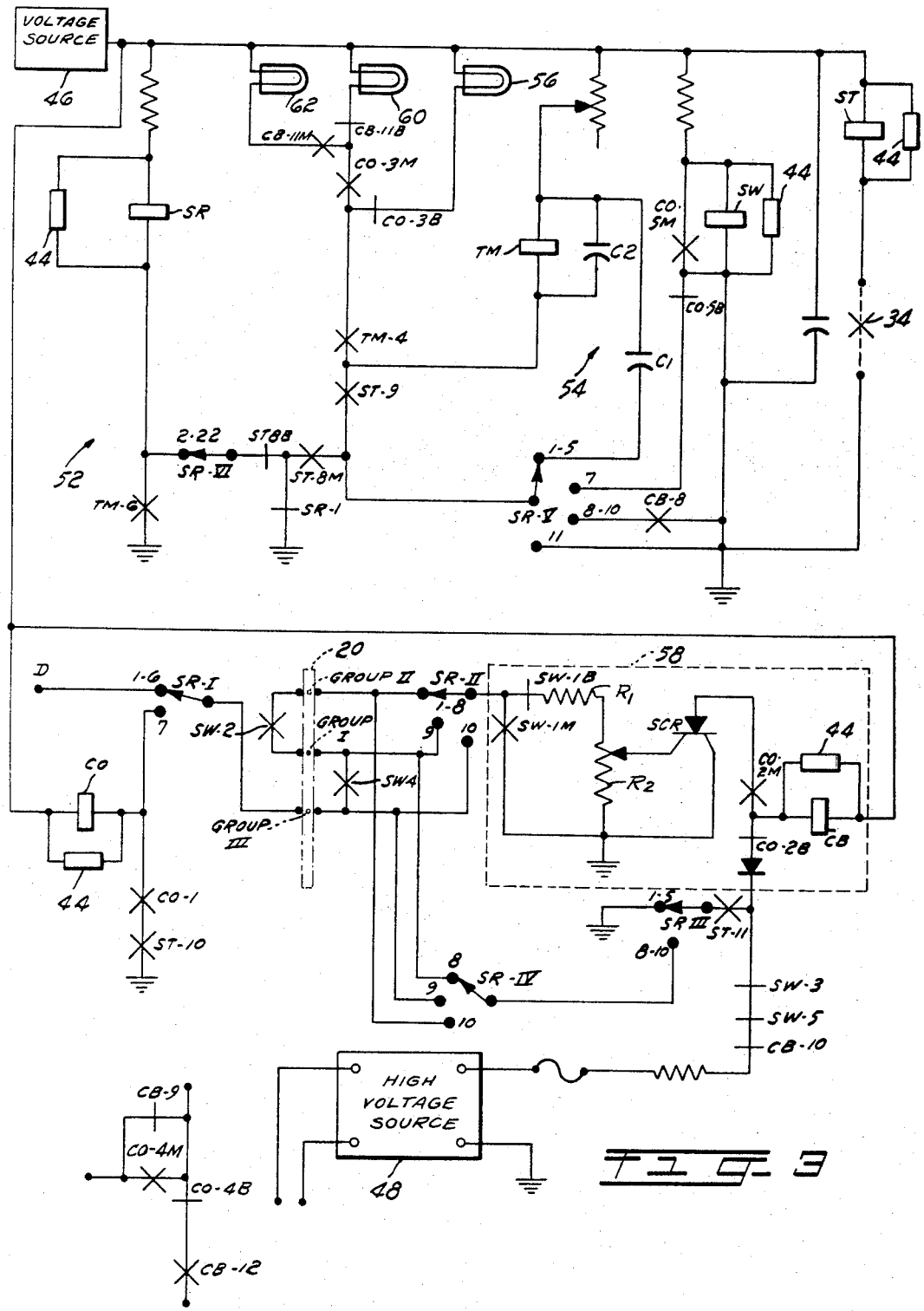
FIG. 3 is a detached contact schematic of a preferred embodiment of the test circuitry.

With reference to FIG. 3, for the sake of clarity, detached contacts are used to represent relay contacts, a cross indicating a make contact, and a bar indicating a break when the relay is energized. Each relay on FIG. 3 is shown with a conventional shunt network 44 to prevent sparking between contacts.

The test circuit (FIG. 3) includes a conventional selector switch SR having six banks, identified as SR–I through SR–VI respectively, each bank having many positions thereon. Each bank except SR–IV has a plurality of positions tied together in order to provide current to certain parts of the test circuitry for predetermined intervals.

The test cycle begins with the application of power from a voltage source 46 to the test circuitry, thereby energizing switching relay SW. This results in closure of normally open contact SW–1M, which establishes a path to ground for the board circuit paths to condition test circuit for the current carrying and continuity tests. Simultaneously therewith, normally closed contacts SW–3 and SW–5 open to disconnect a high voltage source 48 from the rest of the test circuitry, two open contacts being provided to prevent arcing from the high voltage source to the test circuitry. Normally open contacts SW–2 and SW–4 also close at this time, to condition the circuit to connect all the paths on a circuit board 20 under test in series.

Current carrying capacity test

Figure 4:
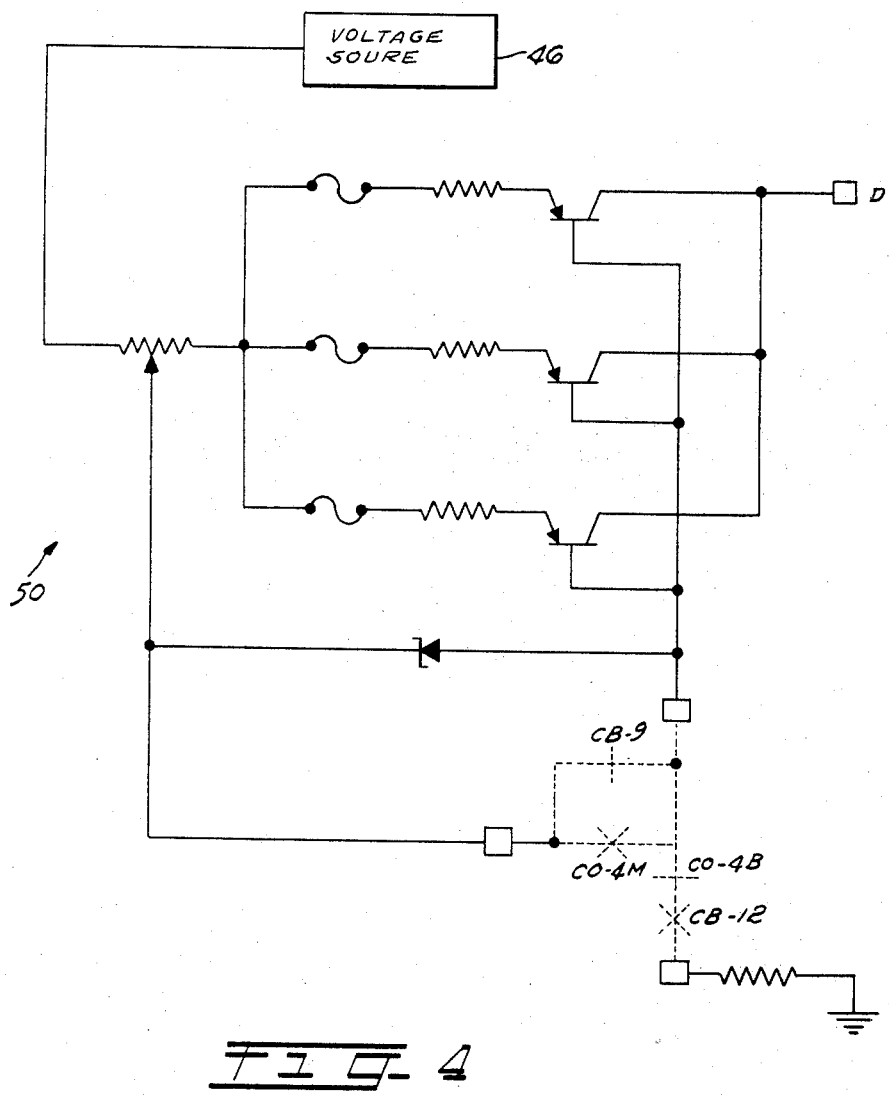
FIG. 4 is a schematic of the constant current power source.

A printed wiring board 20 is inserted in test fixture 10 and cover 26 is closed. This actuates microswitch 34, which energizes start relay ST. This results in closure of normally open contact ST–11 to complete a path from voltage source 46 to ground to thereby energize constant current-breakdown relay CB. Energization of relay CB turns on a conventional constant current source 50 (FIG. 4) by the closure of normally open contact CB–12 and the opening of normally closed contact CB–9. The current from constant current source 50 (approximately three amperes) goes through point D, the selector switch bank SR–I, all the circuit paths on printed circuit board 20, to ground.

At the same time constant current source 50 is connected to the board circuit paths, closure of normally open contacts ST–8M and ST–9 activates a timing circuit 52 which controls the rate of stepping of the selector switch, and therefore, the pace of the test cycle. Timing circuit 52 includes a timing relay TM, a selector switch SR and an RC circuit 54. The RC circuit operates in a conventional manner to control the period of time between the application of current to relay TM and the activation thereof. The closure of contacts ST–8M and ST–9 initiates the timing cycle which will operate in the following manner to cause stepping of the selector switch. After closure of contacts ST–8M and ST–9 there is an interval predetermined by the RC circuit before the TM relay is energized. Energization of relay TM causes the closure of normally open contact TM–6 which causes the energization of the selector switch SR by completing a path to ground therethrough. Energization of selector switch SR immediately causes the opening of its normally closed contact SR–1 which causes de-energization of the TM relay, which in turn causes de-energization of the selector switch SR due to the opening of the contact TM–6. Since the selector switch SR, when d-energized, steps to its next position, the completion of the above cycle causes the brushes of all selector banks to advance one step.

Initiation of the timing cycle will cause the selector switch SR to step continuously until stopped by external factors described below. This continuous stepping is caused by the tying together of the TM relay path to ground and the selector switch SR path to ground in the following manner. When the selector switch SR is de-energized, causing it to step to the next position, contact SR–1 is closed, once again completing the TM relay path to ground and causing the energization thereof. Contact TM–6 is closed, energizing selector switch SR which opens contact SR–1 which de-energizes relay TM, which in turn opens contact TM–6 which de-energizes selector switch SR which causes it to step to its next position and also closes SR–1 which activates relay TM and so on.

Capacitor $C_1$, having a relatively large capacitance, is coupled to the TM relay through selector switch bank SR–V, positions 1–5. When the stepping switch steps to position 6, $C_1$ is disconnected from the TM relay leaving only $C_2$, having a much smaller capacitance, in the RC circuit. This causes the time lapse between the closing of contact SR–1 and the energization of the TM relay to drop from approximately 1 second to approximately $1/25$ of a second and timing circuit 52 will operate the selector switch at the latter rate from this point in the test cycle to the end of the test.

While the selector switch is stepping from positions 1 to 5, bank SR–III thereof provides ground for the CB relay which keeps the constant current source turned on. When the selector switch steps to position 6, relay CB loses ground and is de-energized. This turns off constant current source 50 by the closure of contact CB–9 and the opening of contact CB–12.

Continuity test

The continuity phase of the test commences when the selector switch steps to position 7. As seen in FIG. 3, this will complete a circuit from voltage source 46 selector switch bank SR–I, continuity detection relay CO, the circuit paths of printed wiring board 20, contacts SW–2 and SW–4, selector switch bank SR–II, and contact SW–1M to ground. This circuit will energize relay CO if there are no breaks in the continuity of the circuit paths on printed wiring board 20. If there is a break in the continuity of the circuit paths, relay CO will not be energized. This will have two results: First, normally closed contact CO–3B will remain closed, completing a circuit through an "OPEN" indicating lamp 56; and secondly, the selector switch SR will cease stepping due to the completion of a secondary path to ground through relay TM, contact ST–9, the brush of selector switch bank SR–V on position 7 and normally closed contact CO–5B which keeps relay TM energized. The continuous energization of the TM relay causes the timing circuit to cease its operation since contact TM–6 remains closed, which prevents de-energization of selector switch SR. The test of the printed circuit board is now halted and the fixture may be opened and the board removed by the operator.

If there is no break in the continuity of the circuit paths, relay CO is energized and the test continues. Once the relay CO is energized, it locks itself in an energized state by the closure of normally open contact CO–1.

Spacing and short test

With the energization of relay CO the test circuit is prepared for this test. Normally open contact CO–5M is closed, shorting out the SW relay, thereby de-energizing it. This results in the opening of contacts SW–2 and SW–4 resulting in the separation of the one continuous path through the printed wiring board circuit paths into three separate paths groups.

The purpose of dividing the circuit paths on the printed wiring board into three groups is to set up the circuit board so that a high voltage can be applied between adjacent paths. And, while the operation of the test circuit is discussed with three groups of circuit paths, the test circuit can be adapted in an obvious manner for any number of groups.

Upon energization of relay CO, normally open contact CO–2M is closed connecting relay CB to the anode of a silicon controlled rectifier (SCR) which is part of a breakdown detector circuit 58. At the same time, normally closed contact CO–4B and normally open contact CO–4M are activated, assuring that the constant current source 50 is turned off.

The de-energization of relay SW also closes contacts SW–3 and SW–5 and since normally closed contact CB–10 was closed by the de-energization of relay CB at position 6, a path is completed from the high voltage source 48 to the brush of selector switch bank SR–III. Concurrently, closure of normally closed contact SW–1B connects the brush of selector switch bank SR–II to the detecting circuit 58.

Now the selector switch steps to position 8 and the test commences. The high voltage source 48 is connected to the group of circuit paths on printed wiring board 20 indicated schematically in FIG. 3 as Group I through the brush of selector switch bank SR–III and the brush of selector switch bank SR–IV. At this time the group of circuit paths on printed wiring board 20 indicated as Group II is connected to ground through the brush of selector switch bank SR–II and resistor R1 and R2 of the detector circuit 58. If there is sufficient spacing, or no shorts, between each path in Group I and its adjoining path in Group II, no high voltage breakdown will occur and the selector switch SR will step to position 9. This will provide high voltage to the group of paths indicated as Group III while Group I is connected to ground. If there is sufficient spacing, or no shorts, between these two groups, selector switch SR will step to position 10. This will connect the paths of Group II to the high voltage source while the paths of Group III are connected to ground. If there is sufficient spacing, or no shorts, selector switch will step to position 11, thereby completing the test, and an "OK" lamp 60 will be lit. Lamp 60 lights up through contacts CB–11B, CO–3M, TM–4, ST–9, bank SR–V in position 11 to ground. The selector is reset by opening the fixture thereby opening microswitch 34, which de-energizes relay ST thereby providing ground for the selector switch bank SR–VI through relay ST–8B.

If there is insufficient spacing or a short at either positions 8, 9 or 10, current will flow between a path in one group to a path in another group which will complete a circuit from high voltage source 48, through the detector circuit to ground. This will cause a current flow through R2 thus creating a voltage between the gate and cathode of the SCR, activating it and energizing relay CB. This will close normally open contact CB–8 to close, providing a secondary path to ground for relay TM, thereby energizing it and stopping stepping of selector switch SR. A "Short-Breakdown" indicating lamp 62 is provided in the circuit, and the closure of the normally open contact CB–11M will cause it to light.

It is to be understood that the above preferred embodiment is merely illustrative of the invention and the principles thereof are applicable to other arrangements that will fall within the spirit and scope thereof.

What is claimed is:

1. In a method of testing a plurality of conductors, the steps of:
   connecting a plurality of individual conductors in a continuous path,
   passing a high amperage current of constant predetermined magnitude through said continuous path for a predetermined time interval to melt and fust open any conductor with an inadequate cross section,
   subsequently applying a lower value current source to said continuous path and simultaneously determining continuity due to current flow,
   dividing said continuous path into a plurality of electrically separated conductors, and
   impressing a high voltage between each conductor and its adjacent conductors and determining inadequacy of spacing between conductors by current flow therebetween.

2. In an apparatus for testing a plurality of conductors:
   means for connecting a plurality of conductors into a continuous series path,
   a first current source of constant and predetermined magnitude sufficient to melt and fuse open any conductor with an inadequate cross section,
   a second current source of lower magnitude than the first current source,
   a high voltage power source,
   means for selectively and sequentially connecting said first current source and then said second current source to said continuous path of conductors, said first source being connected to said conductors for a given interval of time sufficient to melt and fuse open any conductor with an inadequate cross section,
   means for dividing the continuous path into a plurality of electrically separated conductors, and
   means for impressing said high voltage power source across each conductor and its adjacent conductor to test the adequacy of the spacing therebetween.

3. An apparatus for testing the conducting paths on a printed wiring board comprising:
   means for connecting all the conducting paths on a printed wiring board in a continuous series path,
   a high voltage source,
   a first source of current of constant predetermined magnitude,
   a second source of current, said second source generating a lower amperage than said first source,
   means for sequentially connecting said first source and said second source to said continuous path of conductors first to melt and fuse open any conducting paths having an inadequate cross section, and then test the continuous path for continuity, said first current source being connected to said conductors for a predetermined interval of time,
   means for dividing the continuous path into a plurality of groups of electrically separated paths, and
   means for impressing said high voltage source between each of said groups of paths and its adjoining groups to test the adequacy of the spacing therebetween.

4. An apparatus for testing the conducting paths on a printed wiring board comprising:
   means for connecting all the conducting paths on a printed wiring board in a continuous path,
   a high voltage source,
   a first source of current,
   a second source of current, said second source generating a lower amperage than said first source,
   selector switch means having a plurality of banks, each of said banks including a brush and a plurality of brush positions,
   circuit means for driving said selector switch to step to successive positions,
   means for connecting said first source to said continuous path for a predetermined number of selector switch positions to melt and fuse open any conducting paths having an inadequate cross section,
   means for disconnecting said first source from and connecting said second source to said continuous path at another selector switch position to test the continuous path of conductors for continuity,
   means for driving the continuous path into a plurality of groups of paths, and
   means for impressing said high voltage source between each of said groups of paths and its adjoining groups at certain other switch positions to test the adequacy of spacing between the paths in each of the groups.

5. An apparatus according to claim 4, further comprising:
   means responsive to the failure of the continuity test for halting the stepping of the selector switch.

6. An apparatus according to claim 4, further comprising:
   means responsive to the detection of inadequate spacing between adjacent conducting paths for halting the stepping of the selector switch.

7. An apparatus according to claim 4, wherein: said selector switch driving circuit includes:
   timing means for causing the selector switch to be driven at a first rate through said predetermined number of switch positions, and at a second rate through said other switch positions.

References Cited

UNITED STATES PATENTS

| | | | |
|---|---|---|---|
| 2,399,753 | 5/1946 | McLarn | 174—68.5 X |
| 2,844,250 | 7/1958 | Bayha | 324—158 X |
| 3,217,244 | 11/1965 | Glover | 324—54 X |

ARCHIE R. BORCHELT, *Primary Examiner.*

E. L. STOLARUN, *Assistant Examiner.*